Sept. 19, 1950  J. H. ROTTER  2,522,897

PROTECTIVE COVER FOR TELESCOPIC SIGHT LENSES

Filed Aug. 5, 1947

INVENTOR.
JACK H. ROTTER,
BY
McMorrow, Berman & Davidson
ATTORNEYS.

Patented Sept. 19, 1950

2,522,897

UNITED STATES PATENT OFFICE 2,522,897

PROTECTIVE COVER FOR TELESCOPIC SIGHT LENSES

Jack H. Rotter, Cody, Wyo.

Application August 5, 1947, Serial No. 766,225

1 Claim. (Cl. 33—50)

This invention relates to a protective cover for telescopic sight lenses, and more particularly to a cover structure effective to exclude moisture and foreign matter from contact with the lenses of telescopic sights or similar optical instruments, but capable of instant adjustment to permit unobstructive use of the instruments.

Optical instruments, and especially telescopic sights used with firearms, are frequently exposed to widely varying conditions of use resulting in an undesirable accumulation of dirt, moisture and the like, on the lenses, which may not only render the instrument difficult or impossible to use, but also may permanently damage the optical surfaces and other parts exposed.

It is the chief object of this invention to provide a protective cover for application to instruments of the kind referred to, whereby the accumulation of moisture and deleterious foreign matter on the exposed lens surfaces can be prevented, under adverse conditions of use, such as rainy weather, or where excessive amounts of dirt and dust may be encountered.

A further object of the invention is the provision of a protective cover capable of application to existing telescopic sight structures, and having means for effectively excluding dirt and moisture from the lens surfaces, while at the same time being capable of ready and quick adjustment to a condition in which the normal use of the instrument is completely unobstructed.

A still further object of the invention is to provide a cover for telescopic sights of simple design and rugged structure, capable of withstanding the rough usage to which such a device is likely to be subjected.

The invention comprises, briefly stated, a cylindrical body adapted to fit snugly over the end of a telescopic sight or similar optical instrument, and having at one end a pivoted closure carrying a resilient gasket for effectively closing the cover against the entrance of dirt, moisture or other extraneous material. Spring means is also provided for maintaining the closure in either its closed or open position.

The invention will best be understood from the following description, constituting a specification of the same, when taken in conjunction with the annexed drawings, wherein.

Figure 1:
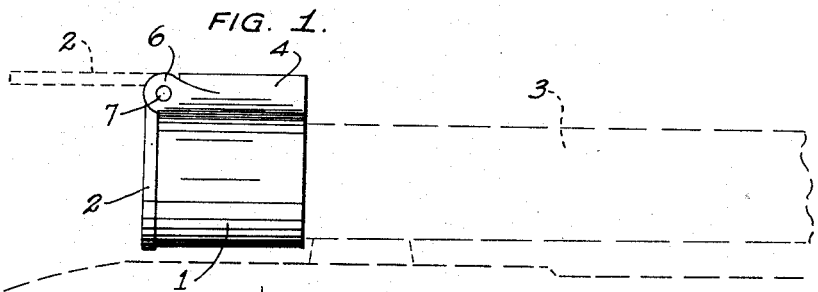
Figure 1 is a side elevational view of the invention, showing the same in position over the end of a telescopic sight, and illustrating the manner in which the device is used.

Referring to the drawings in greater detail, 1 indicates the cylindrical body portion of the cover, and 2 the pivoted closure carried by the same. The cylindrical body 1 has an internal diameter such that the cover may be slipped over the end of a telescopic sight to fit on the same with sufficient friction between the exterior surface of the sight and the interior surface of the cover to maintain the latter firmly in position on the sight.

In Figure 1, the protective cover is shown fitted over the end of a telescopic sight of conventional design, indicated generally by 3 in dotted lines, mounted on some form of firearm with which the sight is to be used.

A cylindrical housing 4 is located along the top of the cylindrical body 1, enclosing mechanism by which the closure 2 is maintained in its open or closed position. Upstanding lugs 5 and 6 extend beyond the housing 4, and also somewhat beyond the end of the cylindrical body which is closed by the closure. These lugs are perforated for the reception of a pivot pin 7 upon which the closure 2 is pivoted.

The closure 2 is of slightly larger diameter than the outside diameter of the cylindrical body, and is provided with a recess 8 for the reception of a resilient gasket 9 which engages the end of the cylindrical body when the closure is in closed position. An extension 10 is provided on the closure, which fits between the upstanding lugs 5 and 6, and is perforated for the reception of the pivot pin 7. The extension 10 is formed with a flattened surface portion 12, as best seen in Figure 2, for a purpose later to be made apparent.

Within the housing 4 there is located a coil spring 14 bearing at one end upon a ball 15 which is thus forced into engagement with the extension 10, and at the other end upon an adjusting screw 16 threaded into the end of the housing. It will be apparent from an inspection of Figure 2 that the force of the spring on the ball 15 can be regulated by adjustment of the screw 16 to any desired amount.

Figure 2:
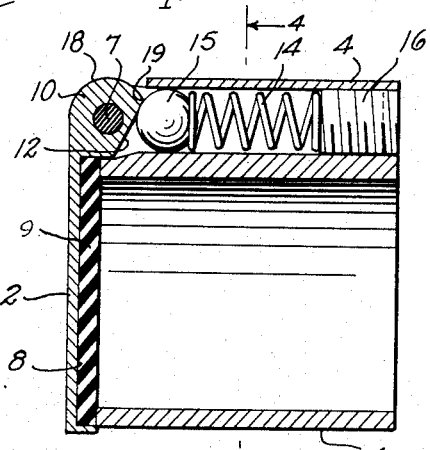
Figure 2 is a vertical cross-sectional view of the invention, taken along the line 2—2 of Figure 3, and showing the internal structural details of the cover, the closure for the same, and the closure-holding means.
Figure 3:
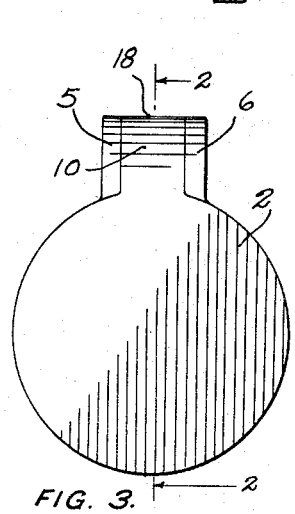
Figure 3 is an end elevational view of the invention looking at the end bearing the closure with the same in closed condition.
Figure 4:
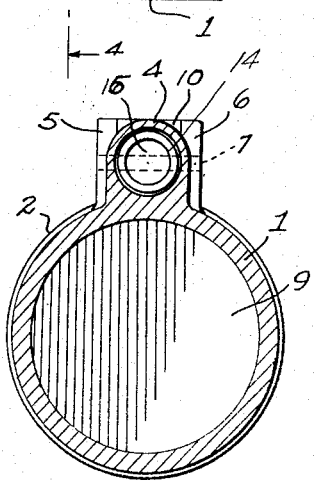
Figure 4 is a vertical cross-sectional view of the invention taken along the line 4—4 of Figure 2.
Figure 5:
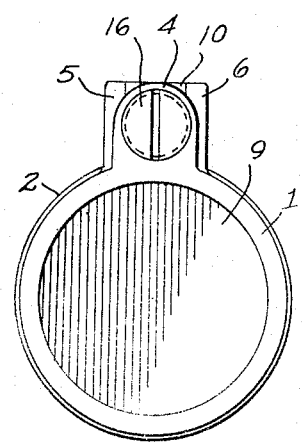
Figure 5 is an end elevational view of the invention looking at the open end of the cylindrical body.

When the telescopic sight or other optical instrument is not in use, the closure 2 will be kept in its closed condition, as best seen in Figure 2, in which position the engagement of the resilient gasket 9 with the end of the cylindrical body will exclude moisture or deleterious material from coming in contact with the exposed lens surface. In the closed condition of the closure 2, the ball 15 bears on the flattened surface portion 12 of the extension 10 below the point 19 where this flattened surface meets the rounded surface 18 of the top of the extension, so that the closure is maintained firmly in closed position, and must be forcibly turned about the pivot pin 7 against the pressure of the spring 14 in order to open the cover.

To open the closure 2, the same is moved about the pivot pin 7, as just described, until the closure reaches its fully opened position, as indicated in dotted lines in Figure 1, during which movement the ball 15 is moved against the pressure of spring 14 by the cam action of the point 19 of the extension 10, and when the closure reaches the open position, the ball 15 bears against the rounded surface 18 of the extension retaining the closure in this position. Pressing down on the closure to move the same to closed position brings the ball 15 into engagement with the flattened surface 12, as soon as the point 19 has been passed, causing the closure to snap shut, and maintaining the same in a tightly closed condition.

The protective cover may, of course, be formed of any suitable material, and in any number of different sizes for application to telescopic sights or similar optical instruments of various sizes. A cover, made in accordance with the invention, may be applied to each end of the optical instrument, thus completely enclosing and protecting all lens surfaces, while at the same time permitting the instrument to be put in a condition for use with a minimum of delay.

It will thus be seen that the invention as described above provides a protective cover of simple design which is easily applied to instruments of the character referred to, and affords a maximum of protection under the adverse conditions to which such an instrument is likely to be subjected.

While the invention has been described with reference to a particular embodiment of the same, it will, of course, be understood that many changes in the details of construction and proportions of the various parts can be made without departing from the spirit of the invention, and within the scope of the annexed claim.

Having thus clearly shown and described the invention, what is claimed and desired to secure by Letters Patent is:

A protective cover for telescopic gun sights and the like, comprising an open cylindrical sleeve for engagement over one end of the telescopic sight, a pair of radially projecting spaced apertured lugs secured to the side of the sleeve adjacent to the outer end thereof, a substantially flat cover plate for the outer opened end of the sleeve and including a radially projecting extension engaging between said apertured lugs and pivotally connected therewith so that the cover plate may be shifted to opened and closed positions, said extension of the cover plate being provided upon its inner side with a single inclined flat face extending generally radially of the sleeve when the cover plate is closed and substantially parallel to the sleeve when the cover plate is open, the extension of the cover plate having its outer edge rounded between said inclined flat face and the outer side of the cover plate, a small longitudinally extending sleeve secured to the side of the first-named sleeve adjacent to the extension of the cover plate and having its end nearest the cover plate open, a ball detent slidably mounted within the small sleeve for engagement with the extension of the cover plate, an expansible coil spring mounted within the small sleeve behind the ball detent for urging it into engagement with the extension of the cover plate, and an adjustable screw plug mounted within the end of the small sleeve remote from the cover plate for varying the tension of the coil spring, the ball detent engaging the inclined flat surface of the cover plate extension for releasably holding the cover plate in the closed position.

JACK H. ROTTER.

REFERENCES CITED

The following references are of record in the file of this patent:

UNITED STATES PATENTS

| Number | Name | Date |
| --- | --- | --- |
| 399,714 | Wesselmann | Mar. 19, 1889 |
| 849,409 | Martin | Apr. 9, 1907 |
| 936,807 | Pedersen | Oct. 12, 1909 |
| 1,310,255 | Smith | July 15, 1919 |
| 2,388,995 | Pollock | Nov. 13, 1945 |

FOREIGN PATENTS

| Number | Country | Date |
| --- | --- | --- |
| 319,977 | Germany | 1920 |